United States Patent [19]
Yaguchi

[11] Patent Number: 5,638,400
[45] Date of Patent: Jun. 10, 1997

[54] RECEIVER

[75] Inventor: Tatsuya Yaguchi, Yokohama, Japan

[73] Assignee: Canon Kabushiki Kaisha, Tokyo, Japan

[21] Appl. No.: 563,439

[22] Filed: Nov. 24, 1995

Related U.S. Application Data

[63] Continuation of Ser. No. 136,266, Oct. 15, 1993, abandoned.

[30] Foreign Application Priority Data

Dec. 15, 1992 [JP] Japan ..................... 4-354182

[51] Int. Cl.$^6$ .................................... H03H 7/30
[52] U.S. Cl. ..................... 375/232; 375/229; 375/231; 375/233; 375/317
[58] Field of Search ..................... 375/224, 229, 375/230, 231, 232, 340, 346, 349, 317, 316, 233, 263

[56] References Cited

U.S. PATENT DOCUMENTS

| | | | |
|---|---|---|---|
| 5,159,609 | 10/1992 | Palicot | 375/14 |
| 5,210,774 | 5/1993 | Abbiate et al. | 375/14 |
| 5,228,058 | 7/1993 | Ushirokawa | 375/14 |
| 5,247,541 | 9/1993 | Nakai | 375/14 |
| 5,260,974 | 11/1993 | Johnson et al. | 375/94 |
| 5,283,531 | 2/1994 | Serizawa et al. | 375/102 |

*Primary Examiner*—Edward L. Coles, Sr.
*Assistant Examiner*—Madeleine Av Nguyen
*Attorney, Agent, or Firm*—Fitzpatrick, Cella, Harper & Scinto

[57] ABSTRACT

A receiver arranged in such a manner such that when a variation is detected in the level of a receiving signal, wherein the variation occurs due to an instant break of a line or the like, and thus the updating or equalization characteristics of an equalizer is stopped by setting a convergence factor to 0, if the level of the receiving signal recovers, thereby causing the equalization error to become small, the convergence factor is switched to a predetermined value so that updating of the equalization characteristics starts.

17 Claims, 5 Drawing Sheets

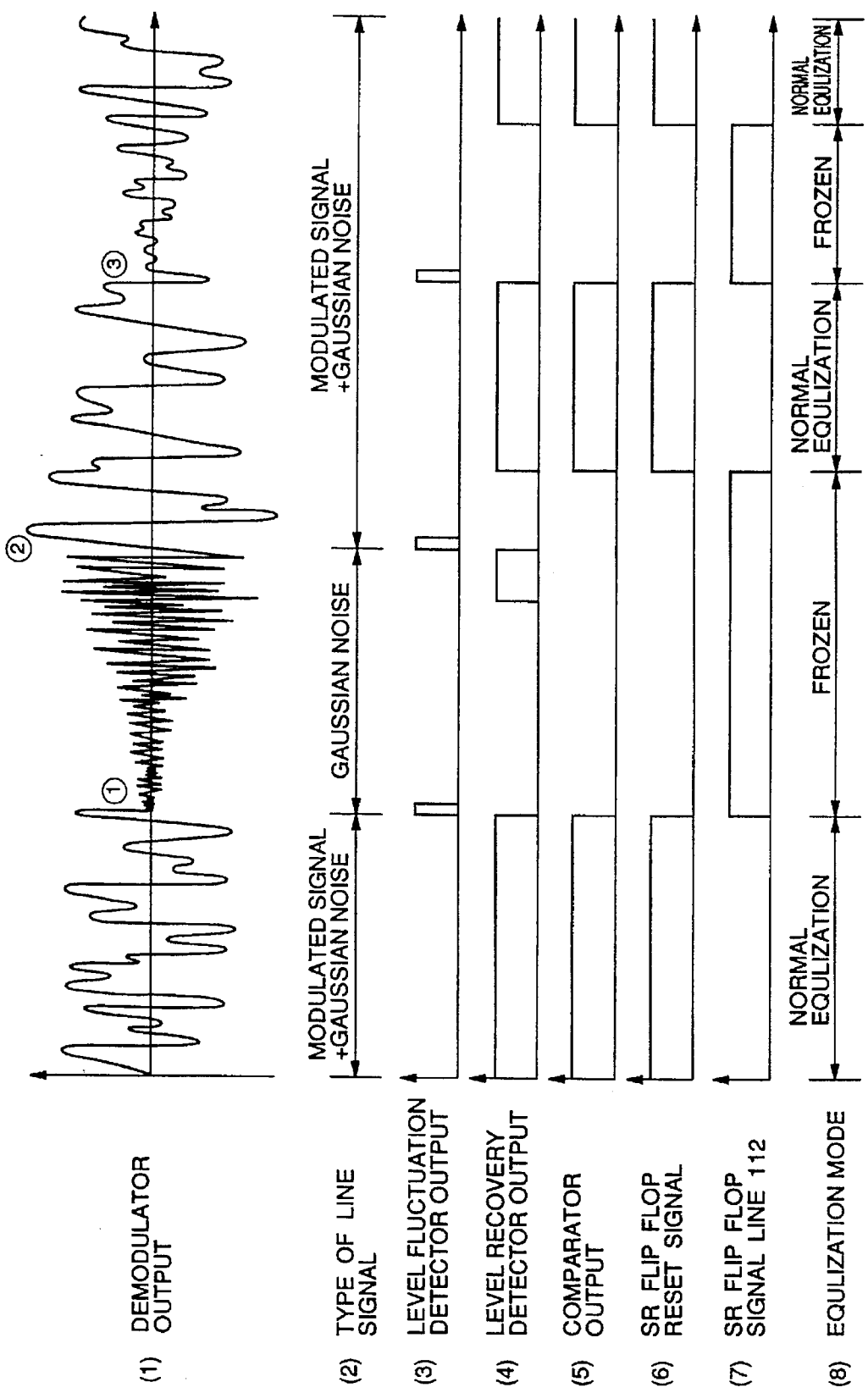

RECEIVER

BACKGROUND OF THE INVENTION

This application is a continuation of application Ser. No. 08/136,266 filed Oct. 15, 1993, abandoned.

FIELD OF THE INVENTION

The present invention relates to a receiver which is capable of adjusting receiving characteristics.

DESCRIPTION OF RELATED ART

Generally, when digital signal data is transmitted via general public lines (analog lines), modems are required to convert digital signals to analog signals or for performing the reverse conversion.

Modems, generally, include a self-adaptive equalizer to compensate line characteristics. Prior to data transmission, a training signal is transmitted. Based on the training signal, the equalizer is adjusted. During the data transmission which follows, the gradual time-dependent variations in the line characteristics are also monitored and based on the variations, the equalizer characteristics are adjusted. This technique is referred to as self-equalization or adaptive equalization.

FIG. 2 is a circuit diagram showing a configuration of a conventional self-adaptive equalizer, which uses transversal filters.

A demodulator 200 converts an incoming modulated signal, received via a line, into a complex base band signal. The complex base band signal is then converted to a complex conjugate base band signal by a complex conjugate converter 204. The complex conjugate base band signal is applied to delay lines 205 constituting a transversal filter.

The delay lines 205 delay the complex signals by a predetermined time. In accordance with each delay line 205, tap gains $C_{-N}^{r+1} \ldots C_0^{r+1} \ldots C_N^{r+1}$ are obtained and are multiplied by the output of the complex conjugate converter 204 and by the outputs of each delay line 205, respectively, with a multiplier 206. An adder 208 calculates the sum of all the products of each tap gain and each delayed complex conjugate base band signal. As a result, equalizer output signal $Y_k$ is given by:

$$Y_k = \sum_{i=-N}^{N} C_i^{r+1} \cdot R^*_{k-i} \quad (1)$$

where $R^*_{k-i}$ denotes the (i)th complex conjugate base band signal input to the equalizer and $C_i^{r+1}$ denotes the value of the (i)th tap gain of the transversal filter which is obtained by the (r+1)th calculation.

The equalizer output $Y_k$, provided by equation (1), is applied to a decision circuit 211. The decision circuit 211 has a plurality of reference signal points and determines the point which is the closest distance to $Y_k$. The decision circuit 211 then outputs this point as a decision point $a_k$.

The difference between the equalizer output $Y_k$ and the decision point $a_k$, that is $E_k = Y_k - a_k$, represents the equalization error at the time k.

In a self-adaptive equalizer tap, gains $C_{-N} \ldots C_0 \ldots C_N$ are modified from time to time such that the mean square of $E_k$ is minimized. In this modification, each tap gain is updated according to the following equation:

$$C_i^{r+1} = C_i^r - \alpha \cdot R^*_{k-i} \cdot E_k \quad (2)$$

where $\alpha$ is a constant, generally called a convergence factor, which may affect the equalization speed.

The circuit for updating the tap gains according to the above equation (2) is configured with delay lines 205, located just below the corresponding tap gains, multipliers 206, adders 207, and a selector 210, as shown in FIG. 2. It is assumed herein that the current output of the selector 210 is convergence factor $\alpha$.

In a modem having self-adaptive equalizer such as that described above, when an instant break or abrupt level fluctuation occurs during data transmission, if adaptive equalization continues in accordance to the tap-gain adjustment algorithm provided by equation (2), the equalization error $E_k$ will become extremely large, and an unexpected large modification of the tap gain will occur.

Therefore, the adaptability of the self-adaptive equalizer is degraded and subsequently, successive decision errors may occur. If the trouble in the line is serious, a divergence in equalization occurs and the adaptability of the equalizer cannot recover.

Some conventional techniques to avoid degradation or divergence of a self-adaptive equalizer due to line trouble will be described below.

Referring to FIG. 2, the demodulator 200 converts a modulation signal received through a line into a complex base band signal. It is assumed that before the incoming modulation signal is applied to the demodulator 200, level adjustment is performed on the signal by AGC with a time constant which is large enough to avoid the influence of the variations of the amplitude of the signal inherent in the modulation signal.

Therefore, when the complex base band signal is applied to the level variation (or fluctuation) detector 201, the detector will detect only an instant break or abrupt fluctuation, which the AGC would not pick up when performing level adjustment in the preceding stage.

To detect the level variation of the incoming modulation signal, the level variation detector 201 is generally configured with a differentiating circuit. In such an arrangement, the level variation detector 201 compares the level variation with a predetermined reference value ($\beta$, maintained in the circuit). If the level variation is larger than the reference value, "1" is output on a signal line 213 so that an SR flip-flop 203 is set. The SR flip-flop 203 then outputs "1" on a signal line 212, thereby causing the selector 210 select "0" as the convergence factor.

Once the set signal is applied to the SR flip-flop 203, the output "Q" maintains a value of "1" until a reset signal is applied to the SR flip-flop 203. Upon reception of the reset signal, the output Q becomes "0". Therefore, once the convergence factor of "0" is selected by the level variation detector 201, the convergence factor is maintained at "0" until the level recovery detector 202 detects that the level of the incoming modulation signal has settled. When the level recovery detector determines that the incoming modulation signal is steady, it outputs "1" on a signal line 214 so as to reset the SR flip-flop 203, thereby causing the signal line 212 to go to "0". As a result, the selector 210 selects "1" as the convergence factor.

The level recovery detector 202 generally includes an energy detector, an averaging circuit, and a decision circuit, so that it may determine whether an incoming modulation signal has a mean energy which is within a predetermined range. If the mean energy is within the predetermined range, "1" is output on the signal line 214; if not, "0" is output on the signal line 214.

The reference value $\beta$, maintained in the level variation detector 201, is set to a value which is larger than that of a typical inherent variation of an incoming modulation signal and which is, at the same time, small enough so as to not miss the level variation which should be detected. The level recovery detector 202 also includes decision boundary values, $\Delta^-$ and $\Delta^+$, which are set to such values not leading to decision errors of level variations.

The above explanation may also be described as follows.

When an instant line break occurs or abrupt line level fluctuations occur, if the level variation detector 201 detects that it is not proper to modify the tap gains of the self-adaptive equalizer, the selector 210 selects a convergence factor $\alpha=0$. In this case, equation (2), which indicates the way of updating of the tap gains becomes $C_1^{r+1}=C_1^r$. Thus, the tap gains are frozen.

On the other hand, when the level recovery detector 202 detects that the line has recovered from the level fluctuation, the selector 210 selects a as the convergence factor so that self-adaptive equalizer may begin line equalization operation. The tap gains are therefore updated in accordance with equation (2).

However, in the conventional arrangement described above, when updating of the tap gains of the self-adaptive equalizer is stopped due to an instant line break, if the line break continues for a time period which is longer than the time constant of AGC, and if the AGC tracks Gaussian noise on the line, then the level recovery detector 202 will erroneously detect that the line has recovered from the level fluctuation. As a result, the equalizer starts operation for the input consisting of Gaussian noise on which level adjustment is performed by the AGC, thereby updating the tag gains for the Gaussian noise, and causing a divergence in equalization.

SUMMARY OF THE INVENTION

It is an object of the present invention to provide a high reliability receiver.

It is another object of the present invention to provide a means to avoid divergence in equalization characteristics.

It is a further object of the present invention to provide a means to avoid erroneous adjustment of receiving characteristics due to Gaussian noise during an instant line break.

It is a still another object of the present invention to provide a receiver which updates its receiving characteristics depending on whether the received signal is a modulation signal.

Other objects of the present invention will become apparent from the following description of the embodiments of the invention.

BRIEF DESCRIPTION OF THE DRAWINGS

FIG. 6 is a timing chart showing the states of individual signal lines in the above embodiment of the present invention.

DESCRIPTION OF THE PREFERRED EMBODIMENT

Figure 1:
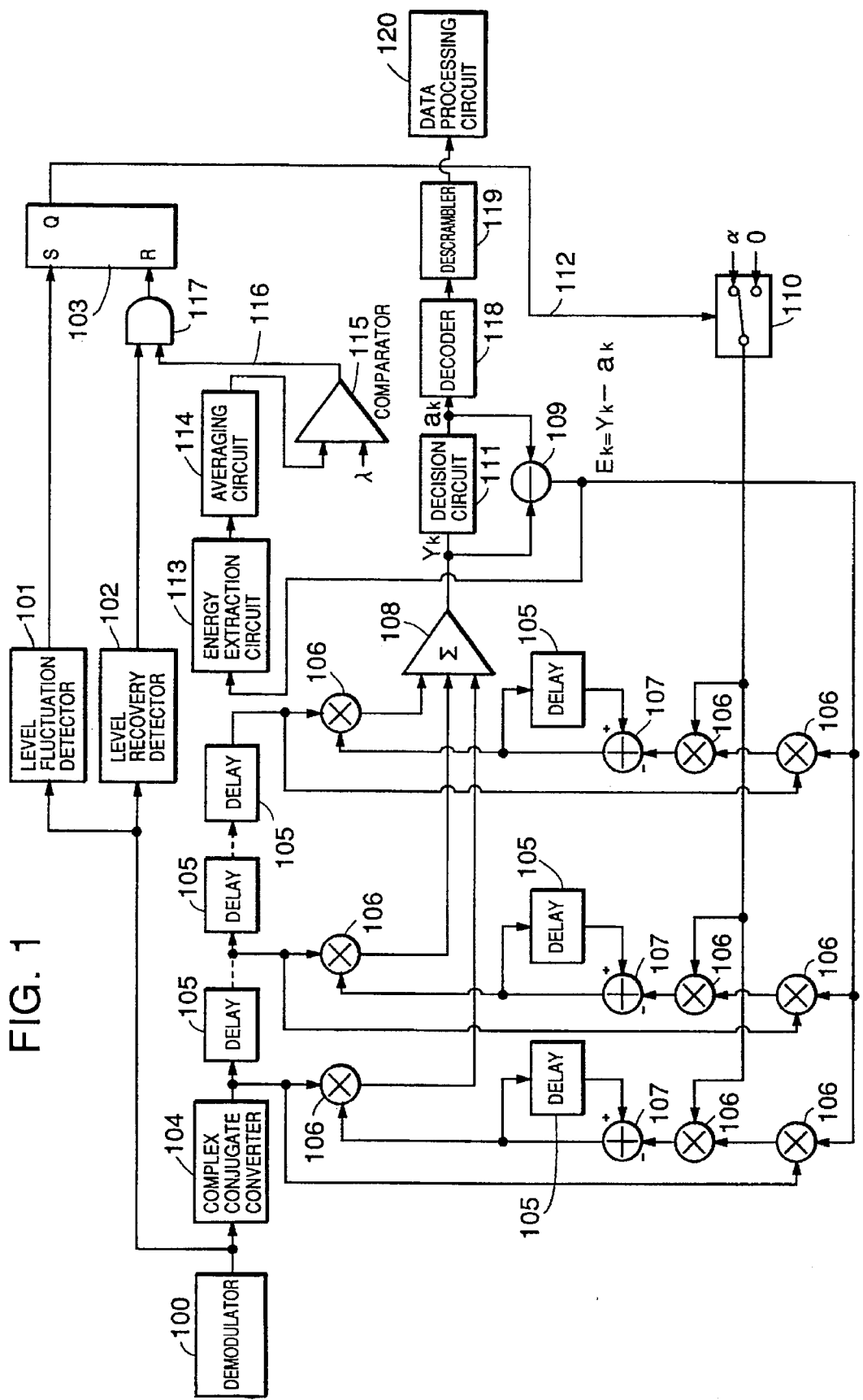
FIG. 1 is a circuit diagram showing the configuration of a receiver provided with a self-adaptive equalizer embodying the present invention.
Figure 2:
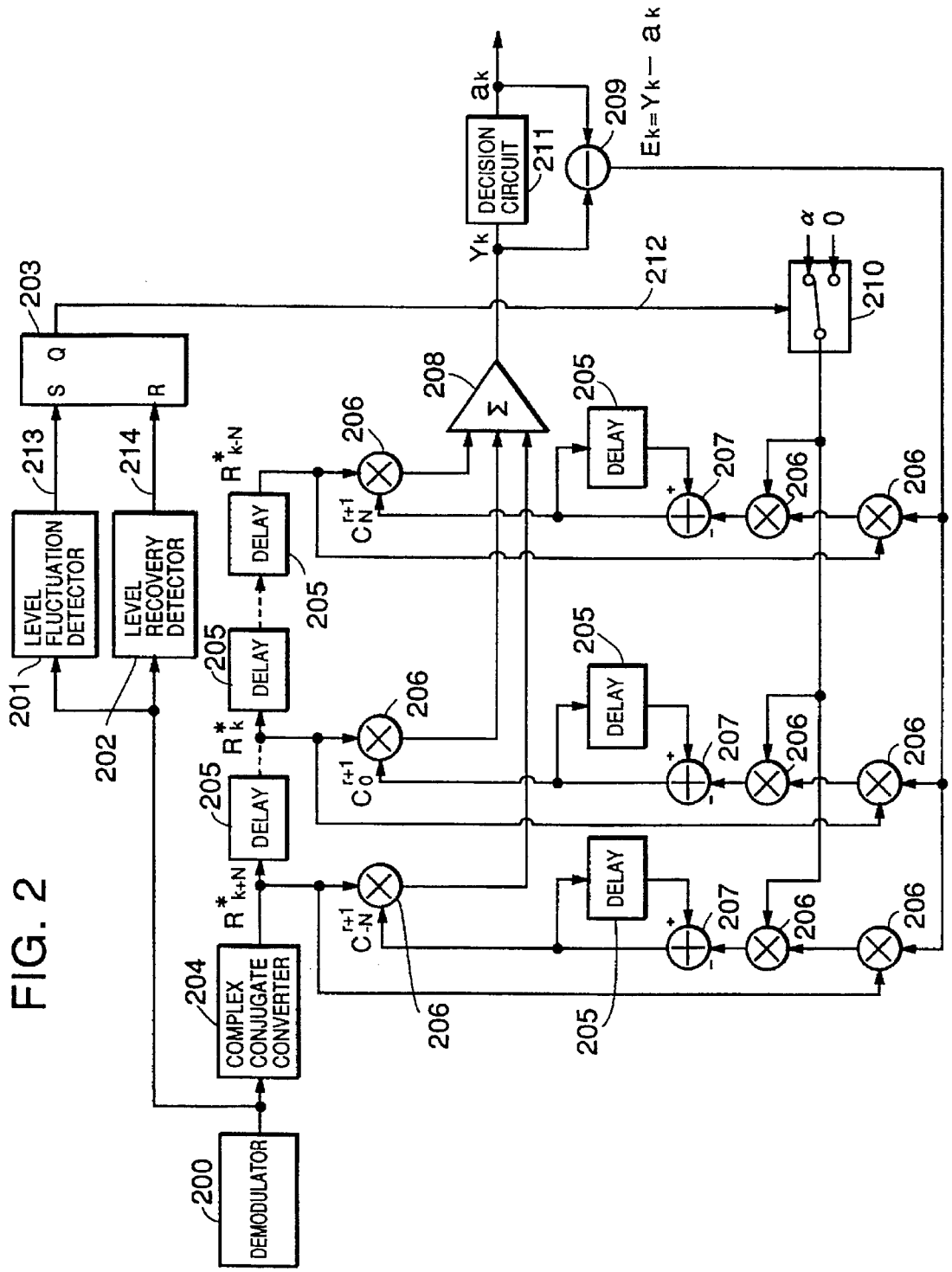
FIG. 2 is a circuit diagram showing the configuration of a conventional self-adaptive equalizer.

FIG. 1 is a block diagram showing a receiver embodying the present invention. The transversal filter of a self-adaptive equalizer, the tap-gain updating circuit, and the manner of switching of convergence factors by the level variation detector are the same as in the conventional arrangement (FIG. 2), and therefore will not be described again.

When an equalizer output $Y_k$ is applied to a decision circuit 111, the decision circuit 111 outputs a decision point $a_k$ associated with $Y_k$. An equalization error $E_k=Y_k-a_k$ is applied to an energy extraction circuit 113. The decision circuit 111 also supplies the decision point $a_k$ to a decoder 118. The decoded output of the decoder 118 is descrambled by a descrambler 119, and is further applied to a data processing circuit 120. The data processing circuit 120 interprets communication procedure signal data such as facsimile procedure signal data. The energy extraction circuit 113 determines the absolute value of the complex equalization error signal and further calculates the square thereof: i.e., the energy extraction circuit 113 outputs $|E_k|^2 = |Y_k-a_k|^2$.

The output of the energy extraction circuit 113 is applied to an averaging circuit 114, consisting of a low pass filter, so as to average the value $|I_k|^2=|Y_k-a_k|^2$. Comparator 115 compares the output of the averaging circuit 114 with a constant $\lambda$. If the mean square error is larger than the constant $\lambda$, it is determined that the current incoming signal is not a modulation signal and the comparator 115 outputs "0" on a signal line 116. If the mean square error is less than the constant $\lambda$, it is determined that the current incoming signal is a desired modulation signal and the comparator 115 outputs "1" on the signal line 116.

Therefore, if the output of the comparator 115 is "1" and if the signal received via the line recovers from level fluctuations thereby causing the output of the level recovery detector 102 to become "1", then the output of a logical AND circuit 117 becomes "1" and a reset signal is applied to the SR flip-flop 103.

When the reset signal is applied to the SR flip-flop 103, a signal line 112 becomes "0" and the selector 110 selects $\alpha$ as a convergence factor. The equalization process then begins and the tap gains are updated according to equation (2) as described in the conventional arrangement.

In contrast, when the mean square error is larger than the constant $\lambda$, even if the output of the level recovery detector 102 is "1", the output of the logical AND circuit 117 does not become "1" and a reset signal is not applied to the RS flip-flop 103.

In this case, the signal line 112 is at "1" and the selector 110 selects 0 as the convergence factor $\alpha$. As a result, the tap-gain updating equation (2) becomes $C_1^{r+1}=C_1^r$, and the tap gains are not updated.

The principle for determining whether a line signal is a modulation signal will be described below, using as an example the signal point locations in the 9600 bps mode in accordance with the CCITT-recommended standard V.29 for modems, with reference to FIGS. 3–5.

Figure 3:
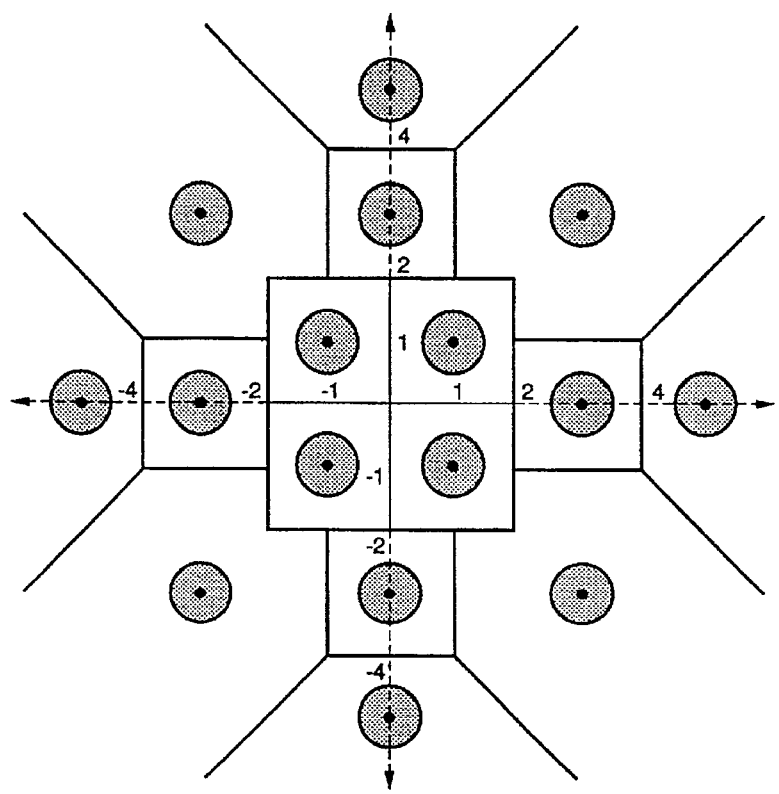
FIG. 3 schematically illustrates signal point locations in the 9600 bps mode in accordance with the standard V.29 for modems recommended by CCITT.

FIG. 3 schematically illustrates signal point locations in the 9600 bps mode. In this figure, the sixteen small solid circles denote the signal point locations in accordance with the recommended standard V.29 for modems in the 9600 bps mode. The solid lines denote decision boundaries in accordance with the simplified decision algorithm.

If a base band receiving signal point corresponds to any one of the points distributed around the sixteen signal points, then the incoming signal can be considered to be a modulation signal in accordance with the recommended standard V.29 for modems in the 9600 bps mode, and the incoming signal is in a state where there is only slight Gaussian noise and the line is equalized so well that only small dispersion occurs (i.e., it is a high probability that $|E_k|^2=|Y_k-a_k|^2<0.5^2$).

Now, let us consider the state where the line has only small Gaussian noise and at the same time there is no incoming modulation signals.

In this case, because there are no modulation signals on the line, the only signal which is adjusted to the standard level by means of AGC is Gaussian noise, and the equalizer outputs $Y_k$ are randomly distributed across the entire 2-dimensional plane.

In such a state, when the line recovers from the instant break and the level recovery detector 102 detects that the level has recovered, there is a very low possibility that the line 115 outputs the mean square of the absolute value of complex equalization error signal which is less than λ (for example, $0.5^2$) in the case where only Gaussian noise exists. However, there is very high possibility that the line 115 outputs the mean square of the absolute value of complex equalization error signal which is less than λ in the case where there exists a modulation signal. Therefore, if λ is set to a proper value, it is possible to distinguish with high accuracy the state where there exist both a modulation signal and Gaussian noise from the state where there exists only Gaussian noise.

The following describes a state where there are an incoming modulation signal and also high Gaussian noise, and therefore line equalization is poor. In this case, even if a transmitter (not shown) sends a signal corresponding to a transmission signal point $a_k'$, the receiving signal point $Y_k$, corresponding to the output of the equalizer, will not always exist within the decision areas due to the influence of the residual equalization error and Gaussian noise. This leads to a large dispersion of the receiving signal points. Even in this case, if value λ, which is used as a reference value by the comparator 115, is selected properly, it will be possible to distinguish the state where there are both a modulation signal and Gaussian noise, from the state where there is only Gaussian noise. The reason why this is possible will be described in more detail below with reference to FIGS. 4 and 5.

Figure 4:
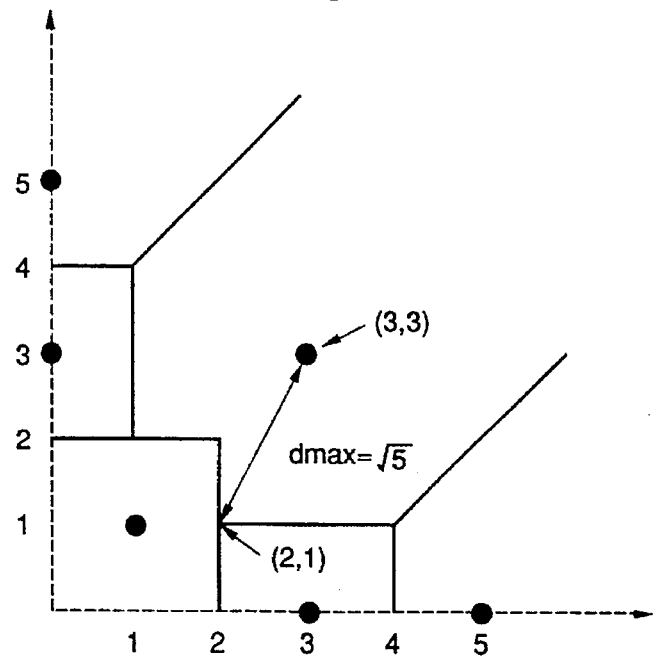
FIG. 4 schematically illustrates signal point locations in the 9600 bps mode in accordance with the standard V.29 for modems recommended by CCITT, showing only those in the first quadrant.

FIG. 4 schematically illustrates signal point locations in the 9600 bps mode in accordance with the recommended standard V.29 for modems, showing only those in the first quadrant. In this figure, the solid lines denote decision boundary lines in accordance with the simplified decision algorithm. The maximum distance between each signal point and the decision boundary lines is denoted by $d_{max}$, where $d_{max}=\{(3-2)^2+(3-1)^2\}^{1/2}=5^{1/2}$. Based on the symmetry of the signal point locations and the decision boundary lines, $d_{max}=5^{1/2}$ has the same value for each quadrant.

Figure 5:
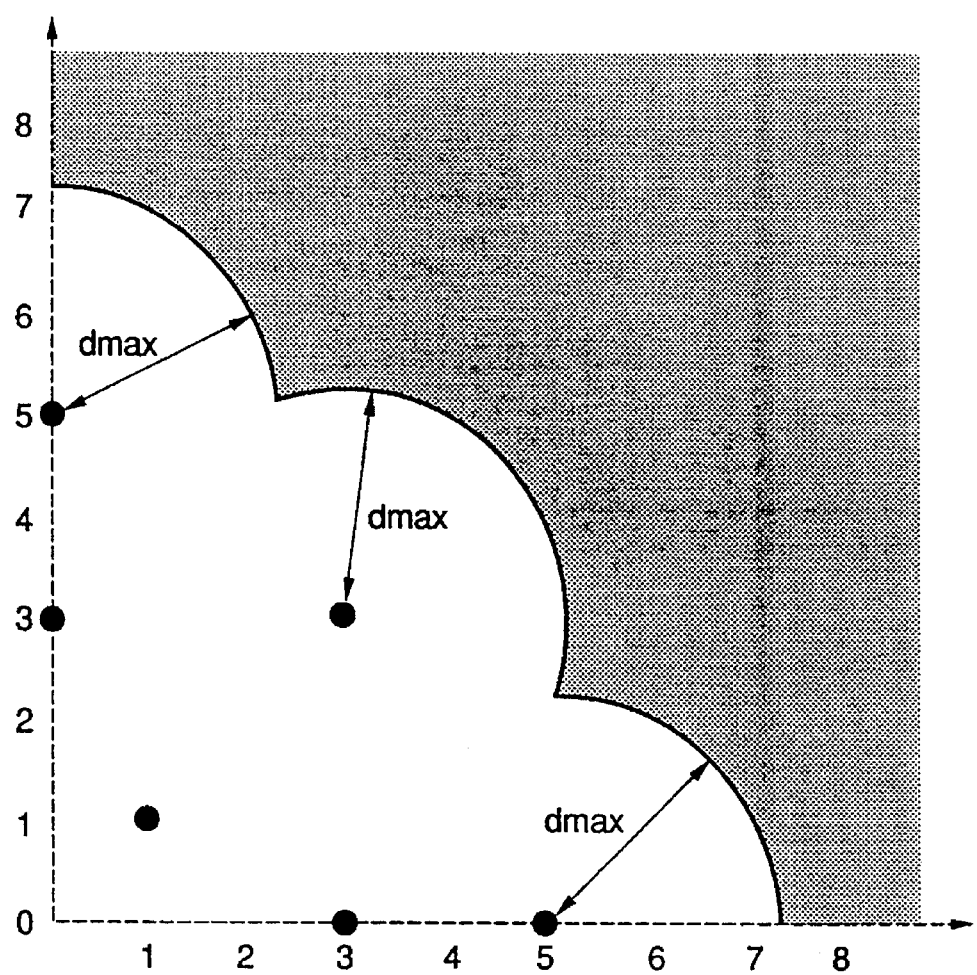
FIG. 5 is schematically illustrates areas of receiving signals.

FIG. 5 shows the area in the first quadrant where the receiving points $Y_k$ can exist, which corresponds to that $|E_k|^2=|Y_k-a_k|^2>d^2_{max}$, in the case in which value A which is used as a reference value by the comparator 115, is made the same as $d_{max}$. Because of the symmetry, similar results are obtained in the second through fourth quadrants.

In FIG. 5, the area in which there are dots is the area which meets the above conditions. In this area, there is a very high probability that there will be only Gaussian noise on the line. When there exists a modulation signal including large Gaussian noise (low S/N ratio), there is a very high probability that the receiving point exists in the area surrounded by the curved lines, the X axis, and the Y axes in FIG. 5.

As discussed above, if value λ, which is used as a reference value by the comparator 115, is set to a value which is equal to or larger than $d_{max}$ ($\lambda \geq d_{max}$), then it is possible to distinguish with high accuracy the state where there is a modulation signal with a low S/N ratio from the state where there is only Gaussian noise.

The states of the signal lines in FIG. 1 will be described with reference to FIG. 6.

FIG. 6(1) shows the output of the demodulator 100, while FIG. 6(2) shows the corresponding signal types which are on the line. In FIG. 6(1), at the time denoted by the mark ①, an instant line break occurs and the signal changes from a modulation signal to a low level of only Gaussian noise. Following the line break, the level of the Gaussian noise is gradually increased by AGC. At the time dented by the mark ②, a modulation signal suddenly appears, and a rapid level fluctuation occurs. At the time denoted by the mark ③, an abrupt level variation occurs. In this case, in contrast to the case of the instant line break, although the level is low, there is still a modulation signal. FIG. 6(3) shows that the level variation detector 101 outputs "1" at the times ①, ②, and ③ described above.

FIG. 6(4) indicates the output of the level recovery detector 102. When a level fluctuation occurs at time ①, ②, or ③, for a time period following the fluctuation, the level is in an unstable state and the level recovery detector 102 outputs "0" for these periods. FIG. 6(5) shows the output of the comparator 115 which becomes "1" when the output of the averaging circuit 114, i.e., the mean error energy is less than the reference value λ. Therefore, as can be seen from this figure, after the instant line break occurred, the level recovers just before time ②, however, because there is only Gaussian noise, the mean error energy is larger than λ in this case, and thus the comparator 115 maintains "0" at its output.

FIG. 6(6) shows the reset signal applied to the SR flip-flop 103, which is the logical product of the logical value represented by FIG. 6(4) and the logical value represented by FIG. 6(5). Therefore, as can be seen from these figures, the reset signal becomes "1" only when there exists an incoming modulation signal and, at the same time, the level is in a stable state.

FIG. 6(7) shows the output to the signal line 112 from the SR flip-flop 103. FIG. 6(8) shows the corresponding equalization modes. As can be seen from these figures, when there is an incoming signal on the line, and at the same time the level is in an stable state (i.e., when the mean error energy is less than the reference value λ), normal equalization is executed, whereby the tap gains are updated according to equation (2) as described in the conventional arrangement. In other cases, the tap gains are "frozen" (i.e., are not updated).

In an arrangement in accordance with this embodiment, which is capable of distinguishing the incoming modulation noise from Gaussian noise as described above, the equalizer can maintain the "frozen" mode even in the case where an instant line break occurs and continues for a period longer than the AGC time constant, and, during the line break, the AGC follows the level of Gaussian noise on the line and thus the output of the AGC becomes stable. Moreover, normal equalization starts only when the level of the output of the demodulator recovers and when the mean error energy becomes less than the reference value λ. Thus, it becomes possible to avoid divergence in the equalizing operation.

In the embodiment described above, to distinguish a modulation signal containing Gaussian noise from pure Gaussian noise, the mean square of the absolute value of the complex error signal of the output of the equalizer and the output of the decision circuit is used. However, the present invention is not limited to that method. Alternatively, for example, the mean absolute value of the complex error signal may be used to achieve the same purpose.

In the embodiment described above, to average the mean square errors, a low pass filter is used. However, a smoothing circuit for performing moving average or arithmetic mean may also be used.

Furthermore, the selector 110 may be switched by the output of the comparator 115.

The convergence factor may gradually vary in reverse proportion to the output of the averaging circuit 114.

The present invention has been described above with respect to the preferred embodiment. However, the invention is not limited to the above arrangements of the embodiment. It should be understood that various modifications and changes may be made thereto without departing from the spirit and scope of the claims appended hereto.

What is claimed is:

1. A method for updating an equalization speed of an equalizer having a plurality of characteristics, comprising the steps of:

receiving a signal via a line;

supplying the received signal to an equalizer;

judging whether the received signal is a modulation signal based on an equalization error; and releasing a limitation on the equalization speed of the equalizer by setting a convergence factor when a level of the received signal is recovered and the modulation signal is received based on a judgment in said judging step.

2. A method according to claim 1, wherein the characteristics of the equalizer cannot be altered under the limitation.

3. A method according to claim 1, wherein the equalizer characteristics are updated in accordance with the product of the equalization error and the convergence factor.

4. A receiver comprising:

receiving means for receiving a signal via a line;

equalizing means having a plurality of characteristics for equalizing the signal received by said receiving means;

processing means for processing the signal equalized by said equalizing means;

judging means for judging whether a signal received by said receiving means is a modulation signal, based on an equalization error of said equalizing means;

limiting means for limiting an equalization speed of said equalizing means by setting a convergence factor depending on a level of fluctuation of the received signal; and releasing means for releasing a limitation on the equalization speed by said limiting means, depending on a judgement by said judging means.

5. A receiver according to claim 4, wherein said limiting means sets the convergence factor such that the characteristics of said equalizing means cannot be altered.

6. A receiver according to claim 4, wherein the characteristics of said equalizing means are updated depending on the product of the equalization error and the convergence factor.

7. A receiver according to claim 4, wherein said processing means performs interpretation processing on communication procedure signal data.

8. A receiver according to claim 4, wherein said processing means performs interpretation processing on facsimile procedure signal data.

9. A method for updating an equalization speed of an equalizer having a plurality of characteristics, comprising the steps of:

receiving a signal via a line;

supplying the received signal to the equalizer;

deciding the equalization error of the equalizer;

limiting the equalization speed of the equalizer by setting a convergence factor, depending on a level of fluctuation of the received signal; and releasing a limitation on the equalization speed in said limiting step, depending on the equalization error.

10. A method according to claim 9, wherein in the limiting step the convergence factor is set such that the characteristics of the equalizer are not altered.

11. A receiver according to claim 9, wherein the characteristics of the equalizer are updated depending on the product of the equalization error and the convergence factor.

12. A receiver comprising:

receiving means for receiving a signal via a line;

equalizing means having a plurality of characteristics for equalizing the signal received by said receiving means;

processing means for processing the signal equalized by said equalizing means; and releasing means for releasing a limitation on an equalization speed of said equalizing means by setting a convergence factor when a level of the received signal is recovered and the equalization error of said equalizing means exceeds a predetermined value.

13. A receiver according to claim 12, wherein the equalization characteristics of the equalizing means cannot be altered under the limitation.

14. A receiver according to claim 12, wherein the characteristics of said equalizing means are updated depending on the product of the equalization error and the convergence factor.

15. A receiver according to claim 12, wherein said processing means performs interpretation processing on communication procedure signal data.

16. A receiver according to claim 12, wherein said processing means performs interpretation processing on facsimile procedure signal data.

17. A receiver comprising:

receiving means for receiving a signal via a line;

level variation detecting means for detecting a variation in a level of the signal received by said receiving means;

level recovery detecting means for detecting a recovery of the level of the signal received by said receiving means;

equalizing means having a plurality of equalization characteristics for equalizing the signal received by said receiving means;

equalization error detecting means for detecting an equalization error of said equalizing means;

freezing means for freezing the equalization characteristics of said equalizing means by setting a convergence factor depending on a result of said level variation detecting means; and releasing means for releasing a freeze on the equalization characteristics by said freezing means, depending on a result of said level recovery detecting means and said equalization error detecting means.

* * * * *

UNITED STATES PATENT AND TRADEMARK OFFICE
CERTIFICATE OF CORRECTION

PATENT NO. : 5,638,400
DATED : June 10, 1997
INVENTOR(S) : TATSUYA YAGUCHI

It is certified that error appears in the above-identified patent and that said Letters Patent is hereby corrected as shown below:

COLUMN 2

Line 6, "having" should read --having a--; and
    Line 42, "select" should read --to select--.

COLUMN 3

Line 11, "gains" should read --gains,--;
    Line 15, "a" should read --$\alpha$-- and "that" should read --that the--;
    Line 41, "a still" should read --still--; and
    Line 63, "5 is" should read --5--.

COLUMN 4

Line 25, " $|I_k|^2$ " should read -- $|E_k|^2$ --.

COLUMN 5

Line 8, "is" should read --are--; and
    Line 56, "A" should read --$\lambda$--.

UNITED STATES PATENT AND TRADEMARK OFFICE
CERTIFICATE OF CORRECTION

PATENT NO. : 5,638,400

DATED : June 10, 1997

INVENTOR(S) : TATSUYA YAGUCHI

It is certified that error appears in the above-identified patent and that said Letters Patent is hereby corrected as shown below:

COLUMN 6

Line 47, "in an" should read --in a--.

Signed and Sealed this

Eleventh Day of November, 1997

Attest:

BRUCE LEHMAN

Attesting Officer

Commissioner of Patents and Trademarks